United States Patent [19]
Kii et al.

[11] Patent Number: 5,359,265
[45] Date of Patent: Oct. 25, 1994

[54] DISPLAY APPARATUS HAVING PLURAL SCANNING FREQUENCIES

[75] Inventors: Kazuo Kii, Tokyo; Yasunori Mori, Kanagawa, both of Japan

[73] Assignee: Sony Corporation, Tokyo, Japan

[21] Appl. No.: 80,493

[22] Filed: Jun. 24, 1993

[30] Foreign Application Priority Data

Jul. 21, 1992 [JP] Japan .................. 4-214726

[51] Int. Cl.$^5$ .................. H01J 29/70; H01J 29/72
[52] U.S. Cl. .................. 315/367; 348/536
[58] Field of Search .................. 315/367; 358/158, 159; 348/536

[56] References Cited

U.S. PATENT DOCUMENTS 5,138,283  8/1992  Tanizoe .................. 331/14
5,212,552  5/1993  Matsumoto .................. 358/158

Primary Examiner—Theodore M. Blum
Attorney, Agent, or Firm—Lewis H. Eslinger; Jay H. Maioli

[57] ABSTRACT

A display apparatus for displaying a video image operates with plural horizontal scanning frequencies. The apparatus includes a horizontal scanning frequency oscillator for generating a signal in synchronism with a horizontal synchronous signal of an input video signal; and a control unit for controlling a frequency of an output of the horizontal scanning frequency oscillator corresponding to the horizontal synchronous signal of the input video signal. A multi-scan video monitor may be provided for displaying the image relative to any of the plural horizontal scanning frequencies without any turbulence.

12 Claims, 6 Drawing Sheets

DISPLAY APPARATUS HAVING PLURAL SCANNING FREQUENCIES

BACKGROUND OF THE INVENTION

The present invention relates to a display apparatus for displaying a video image which can operate at plural horizontal scanning frequencies, and more particularly to a so-called multi-scan horizontal deflection frequency controlling device for an automatic horizontal synchronization with a video signal input having a variety of frequencies in a display apparatus.

In a so-called multi-scan type display monitor, it is necessary to obtain stable horizontal and vertical generation output in response to horizontal and vertical synchronous signals having different frequencies. In this case, with respect to the vertical synchronous signal, it is relatively easy to follow its frequency change. However, the frequency of the horizontal synchronous signal changes in the range of several tens of kHz. Therefore., in the case where video signals having different horizontal scanning frequencies are inputted, unless the internal horizontal generation frequency is close to the frequency of the input horizontal synchronous signal, it is impossible to lock a PLL circuit for the internal oscillation.

In such a conventional monitor, in general, a so-called micro-computer is used to count a frequency of an input horizontal synchronous signal H.SYNC and to change data of a digital-to-analog convertor DAC for setting a free running frequency of a horizontal scanning frequency generating circuit in order to effect the synchronization even if the input video signals are switched over. For this reason, a ROM which can set, in advance, horizontal scanning frequencies suitable for the input video signals of various frequencies is provided for storing therein data. The data preset in the ROM are selected and transferred to the DAC to set a free running frequency of the horizontal scanning frequency generating circuit whereby the horizontal synchronous signal H.SYNC is controlled to be close to a horizontal driving signal HD which is an output of the horizontal scanning frequency generating circuit.

However, according to this method, it is necessary to hold, in the ROM in advance, data for outputting HDs having the frequencies corresponding to H.SYNCs of the various video signals. In the case where H.SYNCs which are not preset in the ROM are inputted, it would be impossible to respond to the horizontal synchronous signals.

Also, since the conventional system has no function to measure the frequency of the HD signal, if the data of DAC are offset, a horizontal position on the pictorial image would be offset from a desired position even if it would be possible to effect the lock for the horizontal synchronization.

Furthermore, the micro-computer changes the free running frequencies of the horizontal scanning frequency generating circuit in an open loop control on the basis of the data set in the DAC. However, since the horizontal scanning frequency generating output, i.e., HD is not fed back to the micro-computer, the non-uniformity in characteristics of the components will cause the free running frequencies to have errors. In order to avoid this, it is necessary to perform adjustment of the free running frequencies in the manufacture stage with an adjustment volume or the like. This operation is troublesome.

SUMMARY OF THE INVENTION

In view of the foregoing defects inherent in the prior art systems, an object of the present invention is to provide a display apparatus which dispenses with the free running adjustment and may operate a plurality of input horizontal scanning frequencies over a wide range.

According to the present invention, in order to attain this and other objects, there is provided a display apparatus for displaying a video image which can operate plural horizontal scanning frequencies, comprising a horizontal scanning frequency generating means for generating a signal in synchronism with a horizontal synchronous signal of an input video signal; and a control means for controlling a frequency of an output of the horizontal scanning frequency generating means corresponding to the horizontal synchronous signal of the input video signal. The apparatus may include a displaying means for displaying the image.

The control means may comprise a digital processor unit for processing digital data; and a digital-to-analog convertor means for converting output digital data from the digital processor unit to analog data for the horizontal scanning frequency generating means.

The digital processor unit may comprise a CPU for controlling operation; and a memory means for storing a program code and/or data for operating the CPU.

The horizontal scanning frequency generating means may comprise a voltage controlled oscillator (VCO) to be controlled from the output data based on the digital-to-analog convertor means.

The apparatus may further comprise, a free running switch for controlling supply of the horizontal synchronous signal of the input video signal to an input of the horizontal scanning frequency generating means. The free running switch is controlled by the digital processor unit.

The display apparatus may further comprise a video signal processing circuit for processing the video signal for display and a video muting switch for controlling supply of the input video signal to the video signal processing circuit, the video muting switch being controlled by the digital processor unit. The video muting switch is controlled in synchronism with the free running switch by the digital processor unit.

According to another aspect of the invention, there is provided a method for adjusting a free running frequency of an oscillator, comprising the following steps of: cutting off supply of an input signal to an oscillator; comparing frequencies of the input signal and an output signal of the oscillator with each other; and connecting the input signal to the oscillator as a source signal for locking.

The method may further comprise: before cutting off supply of the input signal to the oscillator, measuring the input signal and detecting a vertical blanking interval. In the comparing step, a digital-to-analog convertor is adapted to receive data for controlling a frequency of the oscillator so that the frequency of the oscillator is an average value of two predetermined frequencies.

The method may further comprise the step of: after rough adjustment, performing fine adjustment. The fine adjustment comprises the following steps of: comparing frequencies of the input signal and oscillated signal with each other; if the frequency of the input signal is greater than that of the oscillated signal, then increasing data to the oscillator; if the frequency of the input signal is smaller than that of the oscillated signal then decreasing data to the oscillator; and detecting polarity change of the latest step. The steps of comparing, increasing, decreasing and detecting are repeated at least four times.

DESCRIPTION OF THE PREFERRED EMBODIMENTS

The present invention will now be described with reference to the accompanying drawings.

Figure 1:
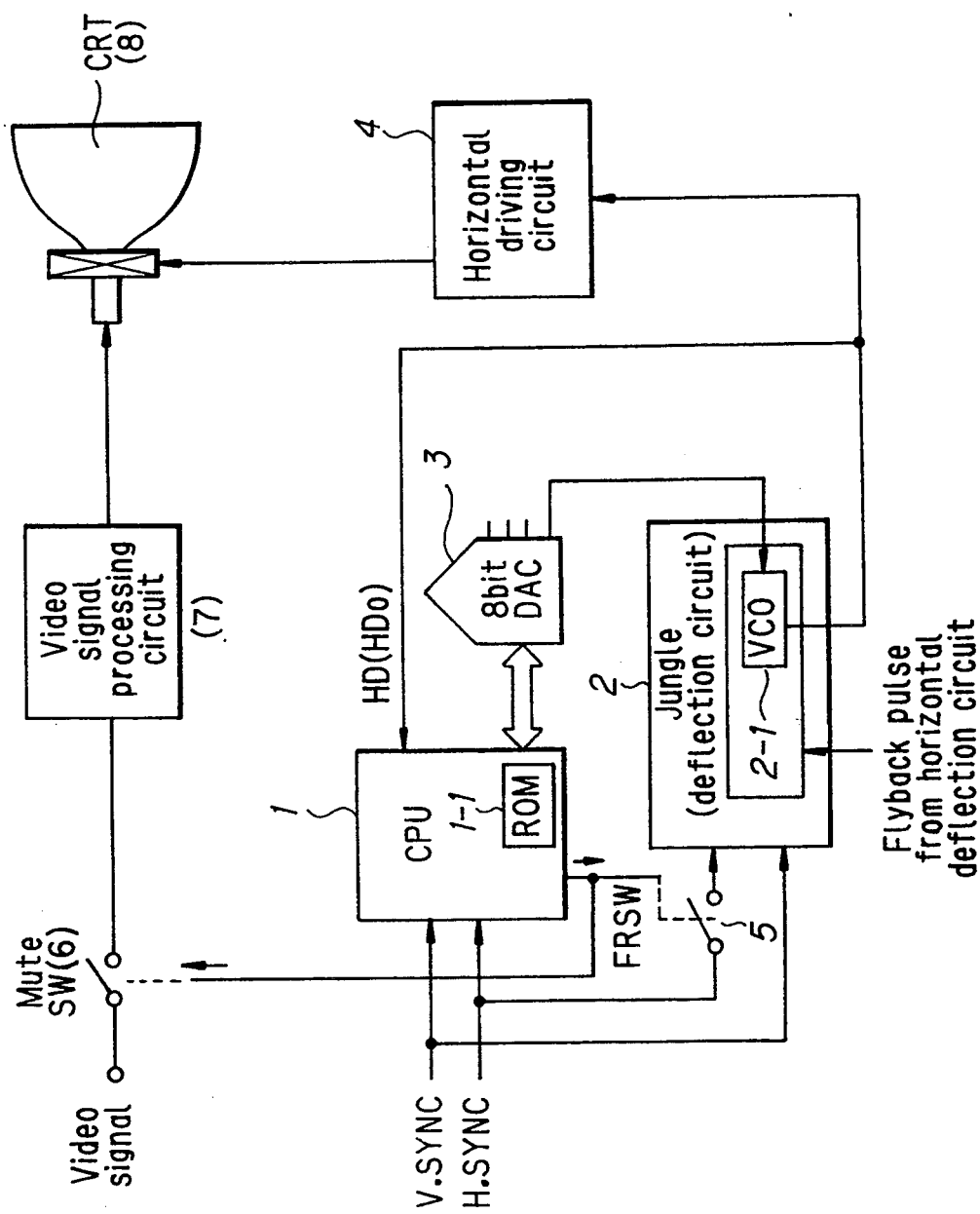
FIG. 1 is a block diagram showing a hardware of a multi-scan horizontal scanning frequency controlling system according to one embodiment of the invention.

FIG. 1 is a block diagram showing a hardware for a multi-scan horizontal scanning frequency controlling system in accordance with one embodiment of the invention. A CPU 1 such as a micro-computer for controlling a scanning system in a so-called multi-scan manner is internally provided with a ROM 1-1 for storing therein data which are needed for setting a free running frequency. Vertical and horizontal synchronization/oscillation circuits are incorporated into a so-called scanning jungle IC 2 (deflection circuit) in which shown is a voltage controlled oscillator VCO 2-1 of the horizontal synchronization/oscillation circuit. The hardware further includes a digital-to-analog convertor (DAC) 3 for controlling a scanning frequency of the voltage controlled oscillator VCO 2-1 on the basis of data from the CPU 1, a horizontal drive output circuit 4, and a switch FRSW 5 for adjusting a free running frequency. A flyback pulse FBP needed for controlling a horizontal scanning frequency (AFC) is fed to the horizontal synchronization/oscillation circuit in the scanning jungle IC 2 from a horizontal scanning output circuit (not shown).

In a normal operation, the switch 5 is closed to be turned on, and the CPU 1 receives vertical and horizontal synchronous signals V.SYNC and H.SYNC of an input video signal and a horizontal driving signal HD which is a horizontal scanning frequency generation output. The CPU 1 measures and supervises frequencies of H.SYNC at all times and a frequency of HD, when necessary, by utilizing its timer function. Then, the CPU 1 feeds data to DAC 3 connected thereto through a serial bus or a parallel bus to thereby determine the horizontal scanning frequency (HD). The thus determined horizontal scanning frequency is close to the frequency of inputted H.SYNC. Therefore, in the jungle IC 2, the horizontal scanning frequency is introduced into an AFC control range where H.SYNC and FBP are compared with each other, thereby to effect the synchronization between H.SYNC and HD or FBP.

In the case where the frequency of H.SYNC is largely changed, the synchronous state is destroyed. In this case, the CPU 1 recognizes the frequency change of H.SYNC and turns the switch 5 off. Thus, H.SYNC is not inputted into the jungle IC 2, and the voltage controlled oscillator VCO 2-1 is held in a free running condition to thereby generate a horizontal drive output HDo on the basis of the free running frequency.

If, in this case, it is desired to execute the adjustment operation on the video image display, it is necessary to temporarily turn a video image signal processing circuit 7 off and to effect a video image mute in order not to display the disturbed image. As shown by a mute switch 6 in FIG. 1, this video mute may be constructed so that the video mute is effected when the switch 5 is turned off and it is released when the switch 5 is turned on.

Under this condition, the CPU 1 measures the horizontal driving signal HDo and counts the free running frequency to thereby change the data of DAC 3 in response to the comparison result of the counted value and the frequency value of H.SYNC. The scanning frequency of VCO 2 is controlled by the data of DAC 3. Namely, a closed control loop is constituted to adjust the scanning frequency to be closest to H.SYNC. Upon completion of the adjustment, the switch 5 is turned on to thereby effect the synchronization under this condition between H.SYNC and HD in the same manner as the normal operation. At the same time, if the video mute is executed, it is released.

The switch-over operation to the "ON" state of the switch 5 is carried out when the operational steps needed for the adjustment are completed. However, it is possible to carry out the switch-ever operation a sufficient time after the adjustment has been completed. As mentioned before, reference numeral 7 designates the video image processing circuit, and reference numeral 8 designates a display device such as a CRT for displaying an information.

Figure 2:
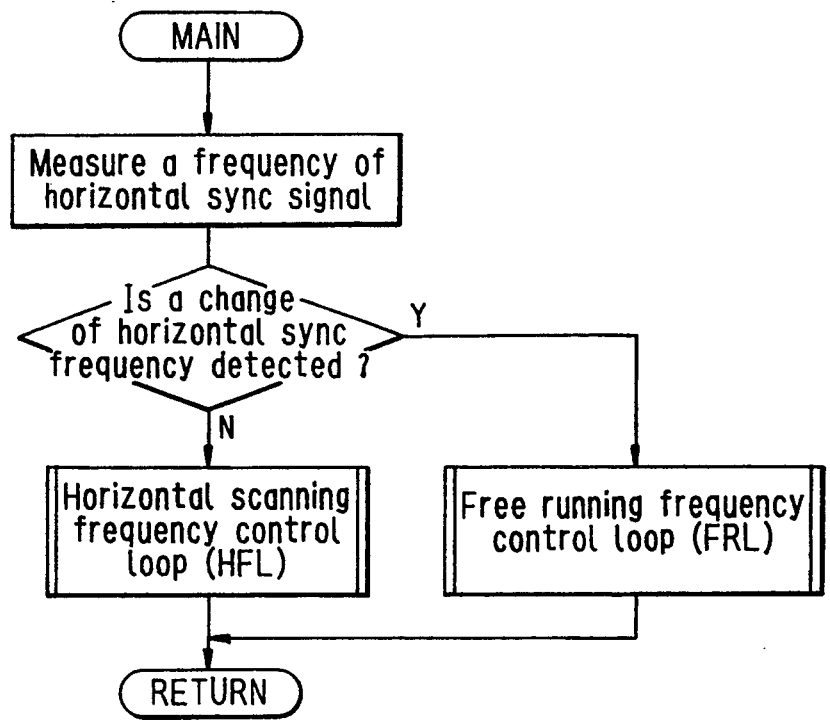
FIG. 2 is a flowchart showing operation for a horizontal scanning frequency control including free running frequency adjustment.

FIG. 2 is a flowchart showing the operation of the horizontal scanning frequency control including the free running frequency adjustment. In a normal condition, the free running frequency adjusting switch FRSW corresponding to the switch 5 is kept udder the closed condition ("ON" state). Under this condition, the H.SYNC frequency is always or periodically measured (step a), and it is judged whether or not there is change in frequency (step b). In this judgement, it is possible to use a method in which the measured value of H.SYNC frequency is compared with the previously measured value and it is judged whether these values are different from each other or not, or otherwise whether or not the difference therebetween exceeds a predetermined level. If the result of the judgement is "NO," it is judged that the difference is in the range where the horizontal AFC may be introduced, and the normal horizontal scanning frequency controlling loop HFL is operated (step c). The horizontal scanning frequency controlling loop HFL is composed of ordinary open loop horizontal synchronization/oscillation circuits.

If the judgement in step b is "YES," it is judged that the difference is out of the horizontal AFC introducible range, and the free running frequency controlling loop FRL is operated (step d).

Figure 3A:
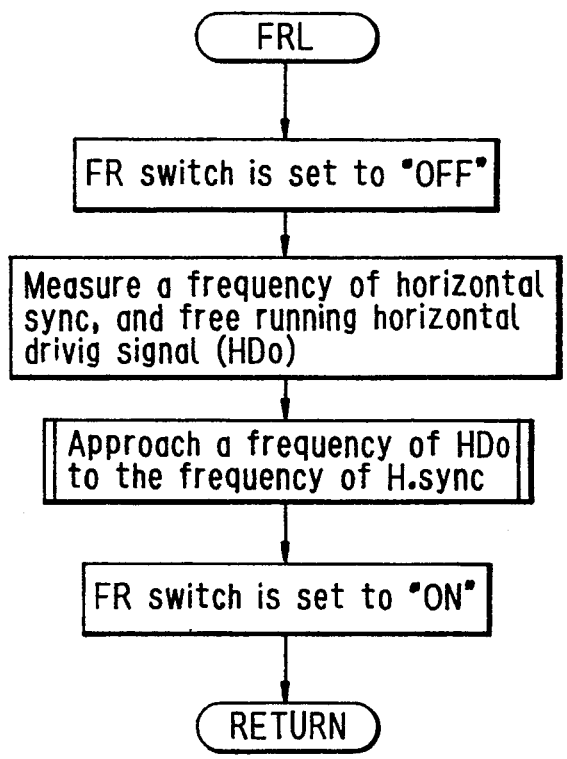
FIGS. 3A and 3B are flowcharts showing examples of operation of the free running frequency control loops.

FIG. 3A is a flowchart showing an example of operation of the free running frequency controlling loop FRL. First of all, the free running frequency adjusting switch FRSW is opened (step e). At this time, the video image mute is effected if necessary. Then, a frequency of a horizontal synchronous signal H.SYNC and a frequency of free running horizontal driving signal HDo are measured (step f). These frequencies are compared with each other to obtain adjustment data and to apply a control voltage to the VCO 2-1 through the DAC 3 shown in FIG. 1, thereby causing the frequency of free running horizontal driving signal HDo to approach the frequency of H.SYNC (routine g). When the free running frequency sufficiently approaches the frequency of H. SYNC, the free running frequency adjusting switch FRSW is closed (step h). At the same time, if the video image mute is effected, it is released. The operation is returned back to the main routine shown in FIG. 2 so that the normal horizontal scanning frequency controlling loop HFL is continued. Thus, the horizontal scanning frequencies are suitably switched over relative to a video signal input having different horizontal scanning frequencies.

Figure 5:
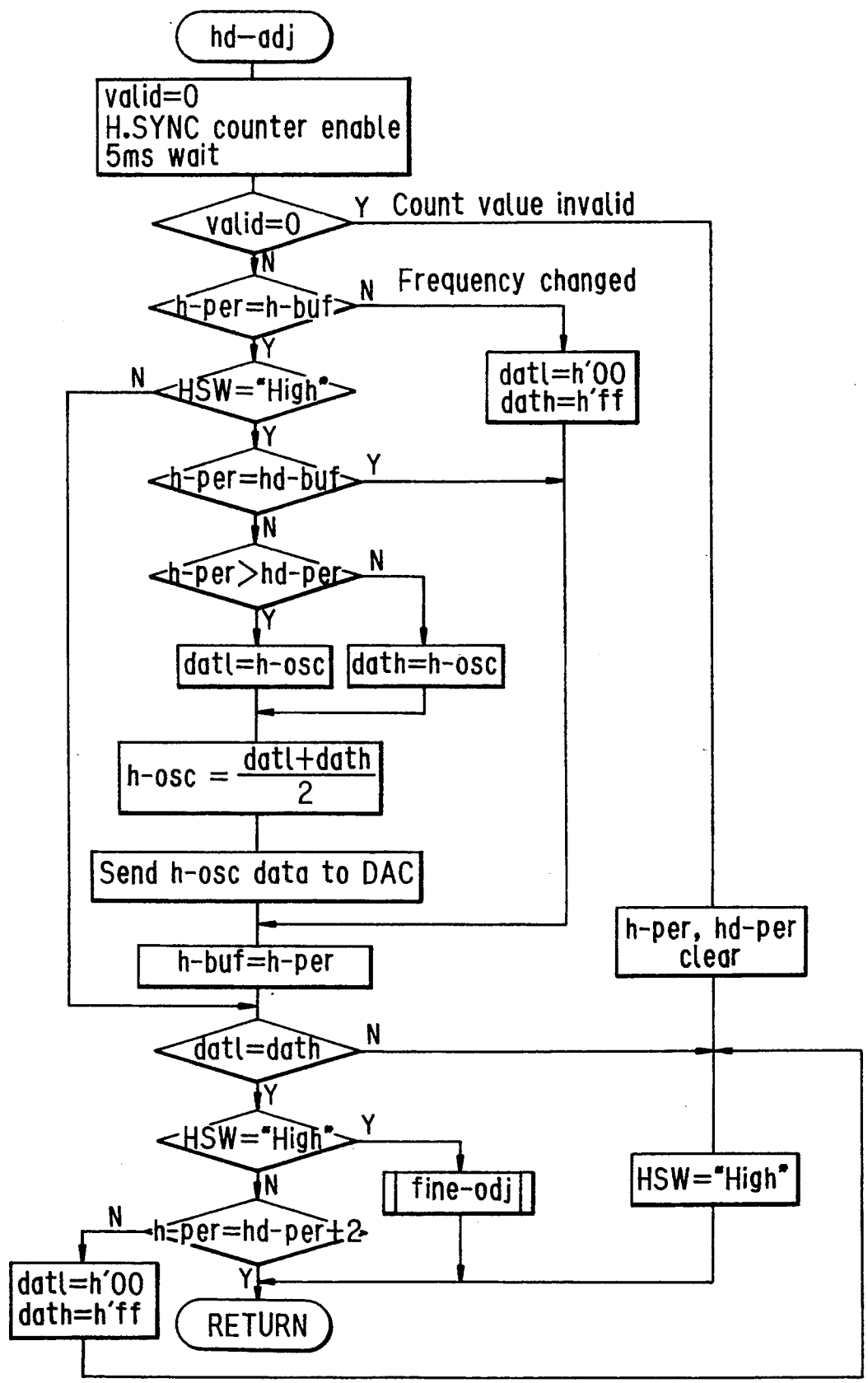
FIG. 5 is a flowchart for the free running frequency adjustment, used in the experiment, in which a frequency of HDo is caused to approach a frequency of H.SYNC in accordance with a so-called two-divisional method.
Figure 6:
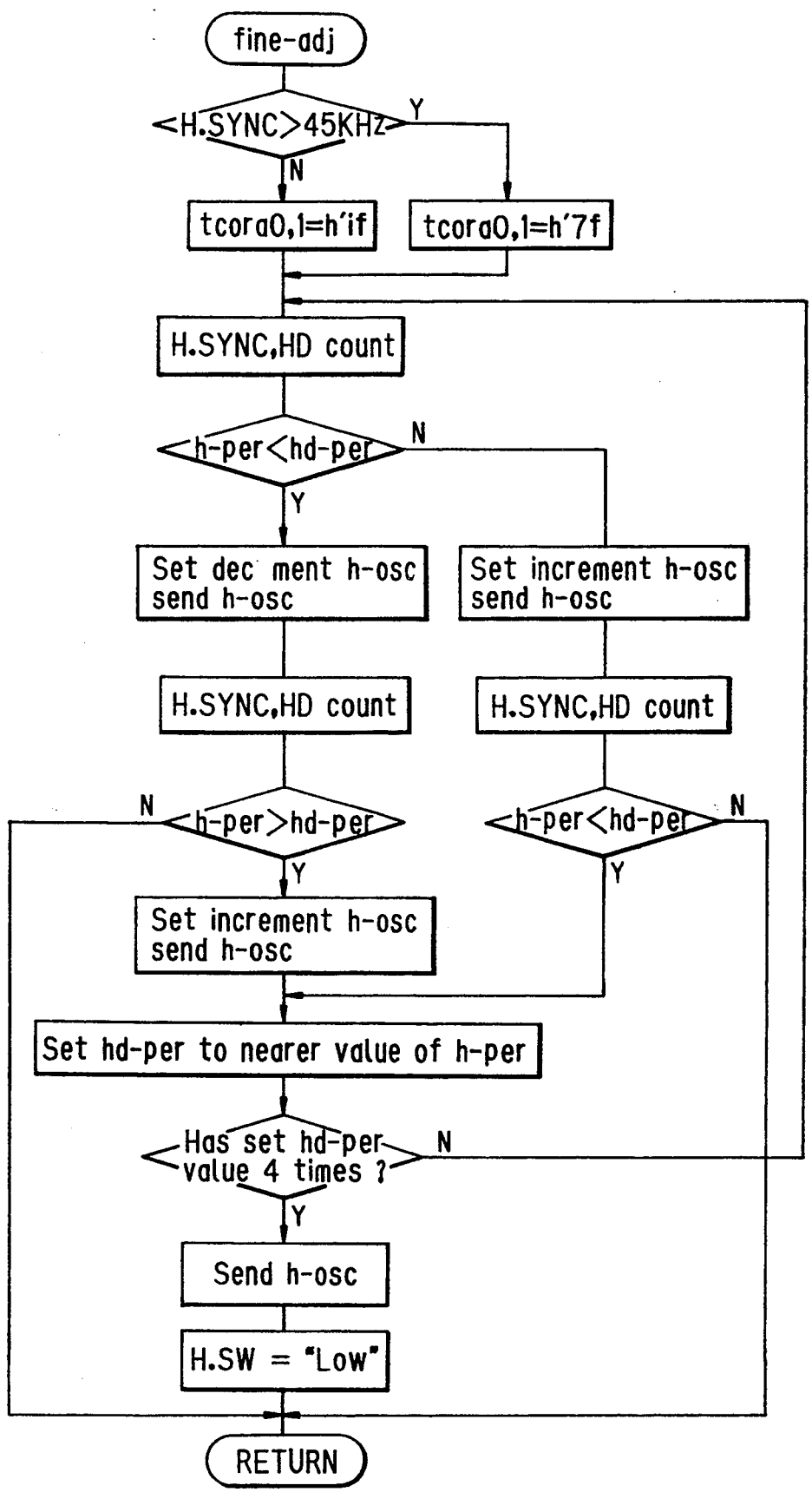
FIG. 6 is a flowchart for a free running frequency fine adjustment, used in the adjustment, in which a final value is obtained by increasing/decreasing the frequency four times.

The routine g may be realized the following methods shown in, for example, FIGS. 5 and 6 to be described later. First of all, the free running frequency of HDo is roughly determined in accordance with a so-called two-division searching method which sets a destination datum to the average value of the two source data. Since HDo is controlled by the 8-bit DAC 3 as shown in FIG. 1, HDo can take only separate values. Subsequently, in order to cause the frequency of HDo to finally most closely approach the frequency of H.SYNC, the frequency of HDo is changed step by step, and a change point at which a plus/minus character (i.e., polarity) of a difference in frequency between H.SYNC and HDo is changed from a positive value to a negative value and vise versa is obtained. Then, the data are increased/decreased at least four times and the data closest to H.SYNC are determined and transferred to the DAC.

In the foregoing method, an adjustment flow is shown in which the input horizontal synchronous signal frequency is supervised or monitored and when it has changed, the free running frequency adjustment is effected. Actually, the CPU 1 periodically executes the following adjustment steps, and when the input horizontal synchronous signal frequency has changed, the free running frequency is adjusted.

i) measuring the input horizontal synchronous signal frequency;
ii) turning the switch 5 off, and effecting the video mute if necessary;
iii) comparing frequencies of H.SYNC and HDo with each other;
iv) setting data to DAC 3; and
v) turning the switch 5 on and releasing the video mute.

If such adjustment steps are periodically executed, it is possible to cancel offset of frequency caused by aging change of components of the horizontal scanning frequency controlling system.

Figure 3B:
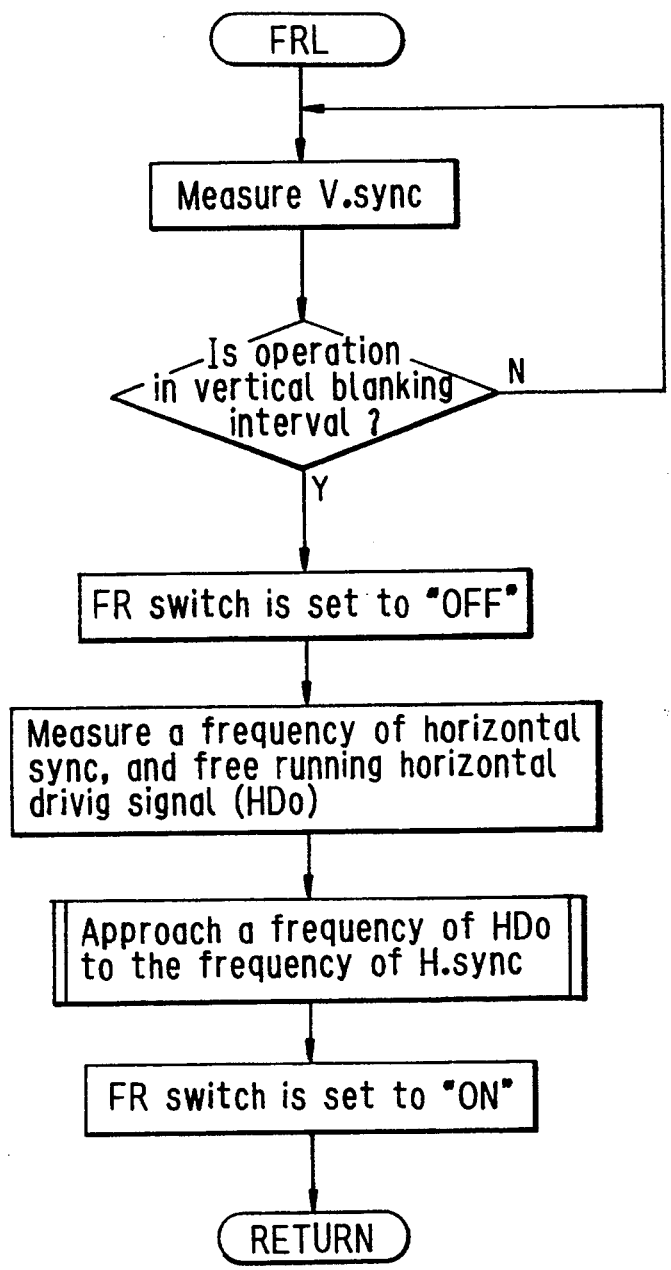

Incidentally, these steps may be executed only in a vertical blanking interval in order to suppress the adverse effect on the video image display. This method is shown in FIG. 3B.

Figure 4:
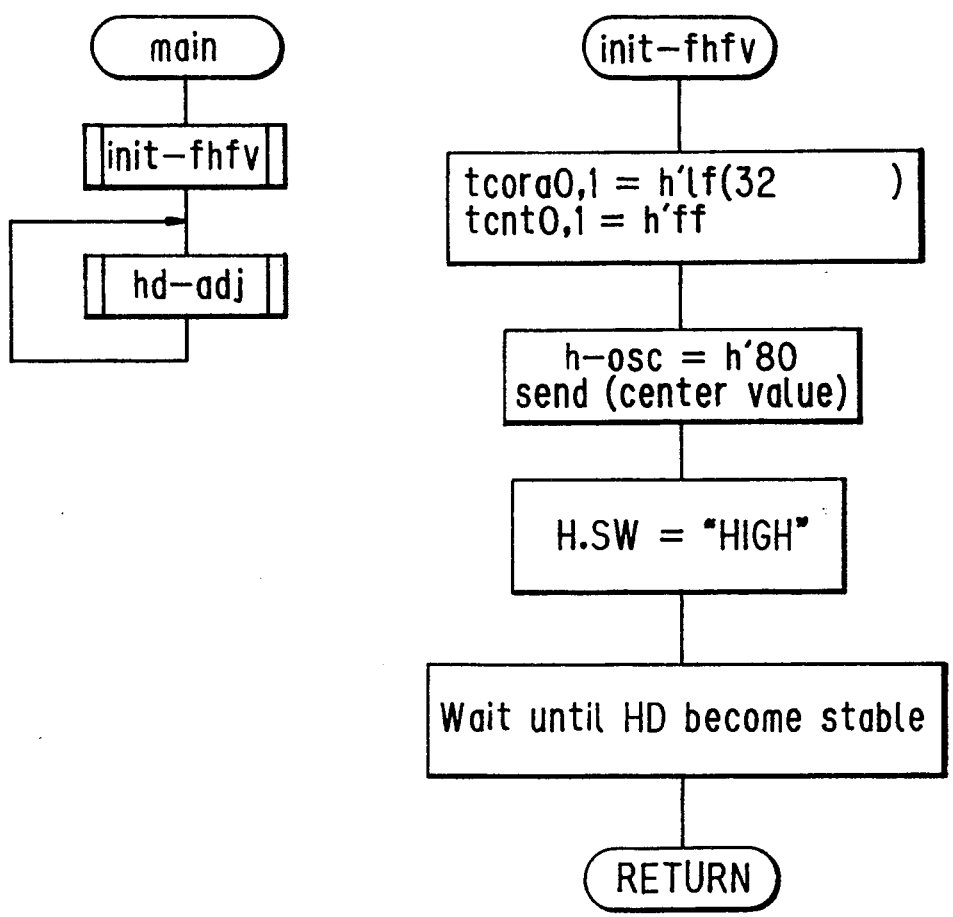
FIG. 4 is a flowchart of a part of the free running frequency adjustment, used in an experiment, up to a state where the oscillated output is stable.

Actually, the periodic adjustment operation is realized by a software for the CPU 1 and experiments were conducted by incorporating the system into a model of a video monitor. The flowcharts are schematically shown in FIGS. 4, 5 and 6. A routine init-fhfv of FIG. 4 is a flowchart in which setup data h-osc of the scanning frequency are set as a central value, the free running frequency adjusting switch FRSW is turned off (H.SW="HIGH" in FIG. 4) to interrupt the supply of H.SYNC, and the adjustment operation is started after waiting for the condition that the generated output is stable. A routine hd-adj of FIG. 5 is an approaching flowchart for the free running frequency adjustment and for causing the frequency of HDo to approach the frequency of H.SYNC according to a two-division searching method. A routine fine-adj is a fine adjustment flowchart for the free running frequency and for increasing/decreasing the frequency relationship four times to obtain the closest data. In FIGS. 4 to 6, tcora0,1=time constant register
  1f . . . 32 counts, 7f . . . 128 . . . counts
tcnt0,1=timer counter
h-osc=data transferred to DAC which controls HD
valid=1 when counts of H.SYNC and HD are invalid, and 0 when the counts are valid
h-per=cycle of H.SYNC
h-buf=previous value of cycle of H.SYNC
hd-per=cycle of HD
datl=lower limit of data transferred to HD
dath=upper limit of data transferred to HD Incidentally, the reason why in FIG. 6, tcora0,1 is set at h'7f when H.SYNC is greater than 45 kHz is that the resolving power of the frequency is not lowered even if the horizontal scanning frequency is high.

According to the results of the experiments, it was confirmed that when video signals in the range of 30 to 85 kHz were inputted as H.SYNCs, the signals were convergent in about 0.5 seconds. However, sometimes the resolving powers of the measurement counters are different according to the input frequencies, and it would be difficult to precisely judge the frequencies. Therefore, as shown in the routine fine-adj in FIG. 6, it is necessary to change the resolving power of the counter and the frequency judgement condition by the input frequency.

Also, the value of data h-osc of the DAC relative to the input of a frequency is kept substantially constant, but in some cases, there is an offset by one step. In these cases, if the 8-bit DAC is used as in the embodiment, when the value of h-osc is offset by one step, the H.SHIFT amount is offset by about 1 mm on the pictorial image. The following method is effective in order to keep the value of h-osc relative to any input frequency. The input frequency is measured, and only when the frequency has been initially inputted, the value of h-osc is determined by the closed loop according to the invention. Then, the value is stored in the ROM 1-1 such as ERROR. In the case where the value of the frequency was inputted in the past, data of h-osc are read out from the ROM 1-1 and fed to the DAC. Namely, the system may have a "learning" function for the free running frequency setting operation.

Furthermore, in the same manner as in the prior art, since rated data are stored or registered in the CPU in the multi-scan type video monitor, it is possible to preset the free running frequency setup data relative to the various input horizontal scanning frequencies in the ROM of the CPU. With respect to the renewed or preset data, only when the difference in frequency between H.SYNC and HD is large, the data of h-osc are registered again. Namely, it is possible to impart the further "learning" function to the system.

Depending upon the scanning jungle IC 2 to be used, in some cases, their horizontal scanning frequency HD characteristics relative to their h-osc are not under the linear relation. It is possible to apply the free running frequency control of the closed loop according to the invention to these cases without any change. If the relationship between H.SYNC and h-osc is set in the ROM 1-1, it is possible to accelerate the convergence of the control loop in such cases.

Since the multi-scan horizontal scanning frequency controlling system according to the present invention is thus constructed, it is unnecessary to adjust particularly the free running frequency adjustment of the horizontal frequency oscillation circuit during manufacture of the video monitor or to automatically adjust the free running frequency with high precision. Also, in the case where the free running frequency setup data are preset during manufacture of the video monitor, no precise or fine adjustment is required in the manufacture stage since it is possible to precisely set the video monitor by the "learning" effect using the closed control loop of the free running frequency.

In addition, with the controlling system according to the invention, it is possible to suitably carry out the horizontal synchronization relative to the video signal input of any horizontal frequency so long as the dynamic range of the DAC, the horizontal scanning circuit or the like allows the adjustment.

What is claimed is:

1. A display apparatus for displaying a video image of an input video signal having one of a plurality of different horizontal scanning frequencies, comprising:

horizontal scanning frequency generating means including a voltage controlled oscillator for generating a horizontal drive signal in synchronism with a horizontal synchronous signal of an input video signal, said voltage controlled oscillator being responsive to a control signal fed thereto;

a digital-to-analog converter producing said control signal fed to said voltage controlled oscillator in response to a frequency data signal;

digital processor means for controlling a frequency of said horizontal drive signal output from said horizontal scanning frequency generating means and receiving said horizontal synchronous signal of said input video signal, said digital processor means providing said frequency data signal fed to said digital-to-analog converter;

a free-running switch operated by said digital processor means for selectively connecting said horizontal synchronous signal to said horizontal scanning frequency generating means for comparison therein with a flyback pulse fed to said frequency generating means for effecting synchronism between said horizontal synchronous signal and said horizontal drive signal;

said digital processor means comparing said horizontal synchronous signal and said horizontal drive signal and upon detecting a substantial difference therebetween operating said free running switch to disconnect said horizontal synchronous signal from said frequency generating means, whereby upon opening said free running switch said digital processor means changes the frequency data signal fed to said digital-to-analog converter based on the detected difference, whereupon said digital processor means operates said free running switch to connect said horizontal synchronous signal to said frequency generating means; and displaying means for displaying the video image.

2. The display apparatus according to claim 1, further comprising a video signal processing circuit for processing said input video signal for display on said displaying means and a video muting switch for controlling supply of said input video signal to said video signal processing circuit, said video muting switch being controlled by said digital processor means.

3. The display apparatus according to claim 2, wherein said video muting switch is controlled in synchronism with said free running switch by said digital processor unit.

4. A display apparatus for displaying a video image of an input video signal having one of a plurality of different horizontal scanning frequencies, comprising:

horizontal scanning frequency generating means including a voltage controlled oscillator responsive to a control signal fed thereto for generating a horizontal drive signal in synchronism with a horizontal synchronous signal of an input video signal; and a digital-to-analog converter for producing said control signal fed to said voltage controlled oscillator in response to a frequency data signal fed thereto;

control means for controlling a frequency of said horizontal drive signal output from said horizontal scanning frequency generating means and receiving said horizontal synchronous signal of said input video signal and for providing said frequency data signal fed to said digital-to-analog converter;

a free running switch operated by said control means for connecting said horizontal synchronous signal to said generating means for comparison therein with a flyback pulse signal fed to said generating means for effecting synchronism between said horizontal synchronous signal and said horizontal drive signal; and said control means including a central processing unit for comparing said horizontal synchronous signal and said horizontal drive signal and upon detecting a difference therebetween opening said free-running switch and disconnecting said horizontal synchronous signal from said generating means whereby said central processing means changes said frequency data signal fed to said digital-to-analog converter based on the detected difference and thereafter said central processing meats closes said free-running switch and connects said horizontal synchronous signal to said generating means.

5. The display apparatus according to claim 4, wherein said control means further comprises:

memory means for storing a program code and data for operating said central processing unit.

6. The display apparatus according to claim 4, further comprising a video signal processing circuit for processing said input video signal for display and a video muting switch for controlling supply of said input video signal to said video signal processing circuit, said video muting switch being controlled by said central processing unit.

7. The display according to claim 6, wherein said video muting switch is controlled in synchronism with said free running switch by said central processing unit.

8. A method for adjusting a frequency of a horizontal drive signal from an oscillator in a video system, comprising the following steps of:
- detecting a difference between the horizontal drive signal and a horizontal synchronous signal;
- cutting off supply of said horizontal synchronous signal to said oscillator in response to a detected difference;
- comparing frequencies of said horizontal synchronous signal and said horizontal drive signal output from said oscillator with each other;
- changing the frequency of the horizontal drive signal based on the detected difference; and
- reconnecting said horizontal synchronous signal to said oscillator for locking a frequency of said of said horizontal drive signal.

9. The method according to claim 8, wherein, in said comparing step, a digital-to-analog convertor is adapted to receive data for controlling a frequency of said oscillator so that the frequency of said oscillator is an average value of two predetermined frequencies.

10. The method according to claim 9, further comprising the step of:
- after adjusting said frequency of said oscillator to said average value of said two predetermined frequencies, performing the step of adjustment a predetermined number of times.

11. The method according to claim 10, wherein said step of adjustment comprises the following steps of:
- comparing frequencies of said input signal and an oscillated output signal from said oscillator with each other and producing a difference;
- if said frequency of said input signal is greater than that of said oscillated output signal, then increasing a value of data fed to said oscillator;
- if said frequency of said input signal is smaller than that of said oscillated output signal, then decreasing a value of data fed to said oscillator; and
- detecting a plus/minus change of the difference found upon comparing the frequencies of said input signal and said oscillated signal.

12. The method according to claim 11, wherein said steps of comparing, increasing, decreasing and detecting are repeated at least four times.

* * * * *